(12) United States Patent
Hirabayashi et al.

(10) Patent No.: US 6,747,839 B2
(45) Date of Patent: Jun. 8, 2004

(54) MAGNETIC RECORDING/REPRODUCING DEVICE HAVING A POST STOPPER FIXED TO A VERTICAL REINFORCING WALL

(75) Inventors: Koichiro Hirabayashi, Hirakata (JP); Akio Konishi, Sanda (JP)

(73) Assignee: Matsushita Electric Industrial Co., Kadoma (JP)

( * ) Notice: Subject to any disclaimer, the term of this patent is extended or adjusted under 35 U.S.C. 154(b) by 57 days.

(21) Appl. No.: 10/163,736

(22) Filed: Jun. 5, 2002

(65) Prior Publication Data

US 2002/0191329 A1 Dec. 19, 2002

(30) Foreign Application Priority Data

Jun. 14, 2001 (JP) ........................................ 2001-179717

(51) Int. Cl.⁷ ........................................... G11B 15/665
(52) U.S. Cl. ...................................................... 360/85
(58) Field of Search ............................... 360/85, 84, 83, 360/95, 130.21, 130.22, 130.23

(56) References Cited

U.S. PATENT DOCUMENTS

| | | | |
|---|---|---|---|
| 4,122,506 A | * | 10/1978 | Kubo et al. ............ 360/130.23 |
| 4,685,008 A | * | 8/1987 | Ohyama ....................... 360/85 |
| 6,282,057 B1 | * | 8/2001 | Konishi et al. ......... 360/130.23 |
| 6,466,390 B1 | * | 10/2002 | Watanabe .................. 360/74.1 |

* cited by examiner

Primary Examiner—William Korzuch
Assistant Examiner—Angel Castro
(74) Attorney, Agent, or Firm—Renner, Otto, Boisselle & Sklar, LLP

(57) ABSTRACT

A magnetic recording/reproducing device of the present invention in which a tape drawn from a cassette wraps around a rotary head cylinder at a prescribed angle for recording information on or reproducing information from the tape includes: a substrate on which the rotary head cylinder is provided; a tape guide post for drawing the tape from the cassette and causing the tape to wrap around the rotary head cylinder; a tape guide post drive section for driving the tape guide post; and a post stopper for placing the tape guide post at a prescribed position, the substrate including a reinforcing wall in the vicinity of the rotary head cylinder, the reinforcing wall being in a vertical plane with respect to a horizontal plane of the substrate, and the post stopper being provided on the vertical reinforcing wall.

7 Claims, 4 Drawing Sheets

MAGNETIC RECORDING/REPRODUCING DEVICE HAVING A POST STOPPER FIXED TO A VERTICAL REINFORCING WALL

BACKGROUND OF THE INVENTION

1. Field of the Invention

The present invention relates to a magnetic recording/reproducing device used for a videotape recorder, an audio tape recorder, etc., which provides reliable operation whilst being compact in size.

2. Description of the Related Art

Referring to FIGS. 3 and 4, a conventional magnetic recording/reproducing device will be described below.

FIG. 3 is a top view of a conventional magnetic recording/reproducing device. FIG. 4 is a cross-sectional view of the conventional magnetic recording/reproducing device taken along line B—B of FIG. 3.

In FIGS. 3 and 4, reference numeral 1 denotes a substrate, reference numeral 1a denotes a horizontal plane of the substrate 1, reference numeral 2 denotes a rotary head cylinder mounted on the horizontal plane 1a of the substrate 1, reference numeral 3 denotes a cassette placed on the substrate 1, reference numeral 4 denotes a (magnetic) tape of the cassette 3, reference numerals 5, 6, 7 and a denote tape guide members for guiding the tape 4, reference numeral 9a denotes a first post stopper, and reference numeral 9b denotes a second post stopper. The post stoppers 9a and 9b have the same structure. Reference numeral 10 denotes a screw used for attaching the post stoppers 9a and 9b to the horizontal plane 1a of the substrate 1. Reference numeral 11 denotes a vertical reinforcing wall provided on the substrate 1 in the vicinity of the rotary head cylinder 2. The reinforcing wall 11 lies in a vertical plane with respect to the horizontal plane 1a of the substrate 1. The vertical reinforcing wall 11 is provided on the substrate 1, since the substrate 1 is required to be precisely maintained in a prescribed condition (e.g., a size and form of the substrate is maintained) and is required to be strong in a region around the rotary head cylinder 2. It is common practice in the field of magnetic recording/reproducing devices to provide a vertical reinforcing wall, such as the vertical reinforcing wall 11, on a substrate of a magnetic recording/reproducing device for this purpose. Reference numeral 12 denotes a first roller post, and reference numeral 18 is a second roller post. As will be described below, the first roller post 12 and the second roller post 18 have the same structure and each of the first roller post 12 and the second roller post 18 includes a roller shaft 13, a roller 14, which is supported by the roller shaft 13 so as to be rotatable about the roller shaft 13, an upper flange 15, and a lower flange 16. The upper flange 15 and the lower flange 16 are placed on the roller shaft 13 and respectively define top and bottom positions of the tape 4 which is caused to wrap around the roller 14. The roller shaft 13 is positioned in a roller post guide member 17 through pressing or the like.

The operation of the above-described conventional magnetic recording/reproducing device will now be described with reference to FIGS. 3 and 4.

The first roller post 12 is moved using the roller post guide member 17 by a tape guide post drive section (not shown) until the upper flange 15 and the lower flange 16 of the first roller post 12 come into contact with the first post stopper 9a, so that the movement of the first roller post 12 is stopped by the first post stopper 9 and is thereby placed in the prescribed position shown in FIGS. 3 and 4. The second roller post 18 is placed in the prescribed position shown in FIG. 3 in a similar manner. In this case, the upper flange 15 and the lower flange 16 of the second roller post 18 are in contact with the second post stopper 9b. The tape guide members 5 and 7 are also moved to their respective prescribed positions shown in FIG. 3 by the tape guide post drive section (not shown). In this operation, the tape 4 is drawn out from the cassette 3 by the motion of the first roller post 12 in a direction away from the cassette 3, the second roller post 18 and the tape guide members 5 and 7, so that the tape 4 is put in the state shown in FIG. 3.

In FIG. 3, E and F denote attachment spans which define the mounting precision of the first post stopper 9a and the second post stopper 9b with respect to the substrate 1, and H denotes the depth of the conventional magnetic recording/reproducing device.

In this conventional structure, in which space is required for attaching the first post stopper 9a and the second post stopper 9b to the horizontal plane 1a of the substrate 1 by screws 10, operational elements cannot be placed in the region around the rotary head cylinder 2, the first post stopper 9a and the second post stopper 9b. As a result, the conventional magnetic recording/reproducing device is required to be larger so as to provide such elements. Moreover, the first roller post 12 and the second roller post 18 provided in the region around the rotary head cylinder 2 are required to be placed in their respective prescribed positions with high precision so as to provide correct and reliable operation of the rotary head cylinder 2 in recording/reproducing information to/from the tape 4, and thus, in the first instance, the first post stopper 9a and the second post stopper 9b are required to be mounted on the substrate 1 with high precision.

In order to achieve such highly precise mounting of the first post stopper 9a and the second post stopper 9b, the attachment spans E and F of the first post stopper 9a and the second post stopper 9b are required to be large so as to provide necessary fine adjustment for the precise placement of the first and second post stopper 9a and 9b. However, the rotary head cylinder 2 Is In the vicinity of the first and second post stoppers 9a and 9b, and thus it is not possible to make the mounting spans E and F sufficiently large to achieve the required high precision. Furthermore, if the attachment span F is lengthened, a distance between the rotary head cylinder 2 and the reinforcing wall 11 provided on the substrate 1 is increased, which creates the following problems. First, If this distance becomes too large, then the effect of the reinforcing wall 11 of strengthening the region around the rotary head cylinder 2 is not provided second, the depth H of the conventional magnetic recording/reproducing device is increased, such that a sufficiently compact device is not achieved.

SUMMARY OF THE INVENTION

According to one aspect of the present invention, there Is provided a magnetic recording/reproducing device in which a tape drawn from a cassette wraps around a rotary head cylinder at a prescribed angle for recording information on or reproducing information from the tape includes: a substrate on which the rotary head cylinder is provided; a tape guide post for drawing the tape from the cassette and causing the tape to wrap around the rotary head cylinder; a tape guide post drive section for driving the tape guide post; and a post stopper for placing the tape guide post at a prescribed position, the substrate including a reinforcing wall in the vicinity of the rotary head cylinder, the reinforcing wall being in a vertical plane with respect to a horizontal plane of the substrate, and the post stopper being provided on the vertical reinforcing wall.

In one embodiment of this invention, the position of the post stopper on the vertical reinforcing wall can be finely adjusted such that the post stopper places the tape guide post at the prescribed position with high precision.

In one embodiment of this invention, the tape guide post includes a first tape guide post and a second tape guide post, and the post stopper includes a first post stopper and a second post stopper for respectively placing the first and second tape guide posts in respective first and second prescribed positions, the first and second post stoppers being respectively provided upstream and downstream of the tape traversal direction around the rotary head cylinder.

In one embodiment of this invention, the post stopper is provided on a back face of the reinforcing wall of the substrate and the substrate has a hole through which a part of the post stopper passes so as to be engaged with the tape guide post and place the tape guide post at the prescribed position.

In one embodiment of this invention, the first and second post stoppers are integrally structured with each other.

In one embodiment of this invention, the integrally structured first and second post stoppers are fixed to the vertical reinforcing wall by screws.

In one embodiment of this invention, the fixing positions of the first and second post stoppers on the vertical reinforcing wall can be finely adjusted such that the first and second post stoppers respectively place the first and second tape guide posts at the respective first and second prescribed positions with high precision.

The magnetic recording/reproducing device according to the present invention includes: a substrate on which a rotary head cylinder is provided; a tape guide post for drawing a tape from a cassette and causing the tape to wrap around the rotary head cylinder at a prescribed angle; a tape guide post drive section for driving the tape guide post; and a post stopper used for placing the tape guide post at a prescribed position, in which the substrate includes a reinforcing wall in the vicinity of the rotary head cylinder, the reinforcing wall being in a vertical plane with respect to a horizontal plane of the substrate and having the post stopper fixed thereto.

With this structure of the present invention, it is possible to provide a compact, reliable and precisely structured magnetic recording/reproducing device in which a post stopper can be mounted on a substrate with high precision by employing large attachment spans without requiring a space for attaching the post stopper to the substrate in a region around the rotary head cylinder.

Thus the invention described herein makes possible the advantages of providing a magnetic recording/reproducing device in which a post stopper can be mounted with high precision without requiring a space for attaching the post stopper around a rotary head cylinder.

These and other advantages of the present invention will become apparent to those skilled in the art upon reading and, understanding the following detailed description with reference to the accompanying figures.

DESCRIPTION OF THE PREFERRED EMBODIMENTS

A magnetic recording/reproducing device of the present invention includes: a substrate on which a rotary head cylinder is provided; a tape guide post for drawing a tape from a cassette and causing the tape to wrap around the rotary head cylinder at a prescribed angle; a tape guide post drive section for driving the tape guide post; and a post stopper used for placing the tape guide post at a prescribed position, in which the substrate includes a reinforcing wall in the vicinity of the rotary head cylinder, the reinforcing wall being in a vertical plane with respect to a horizontal plane of the substrate and having the post stopper fixed thereto. The post stopper is directly fixed to the vertical reinforcing wall, and thus a space is not required to be provided for attaching the post stopper to the substrate in a region around the rotary head cylinder, such that large attachment spans for highly precise positioning of the post stoppers can be provided while providing strength in the region around the rotary head cylinder provided by the reinforcing wall and providing a minimal depth of the device. Thus, it is possible with the present invention to provide a compact and precisely structured magnetic recording/reproducing device in which a post stopper can be mounted on a substrate with high precision.

In a specific example, the magnetic recording/reproducing device according to the present invention includes a first tape guide post and a second tape guide post, a first post stopper and a second post stopper respectively for placing the first and second tape guide posts in respective first and second prescribed positions and respectively provided in the vicinity of the rotary head cylinder upstream and downstream of the tape traversal direction around the rotary head cylinder. The first and second post stoppers are integrally structured with each other and are directly fixed to the vertical reinforcing wall of the substrate, and thus it is possible to provide a precisely structured magnetic recording/reproducing device in which the post stoppers can be mounted on the substrate with high precision by using large attachment spans.

Hereinafter, examples of the present invention will be described with reference to FIGS. 1 and 2.

EXAMPLE 1

Figure 1:
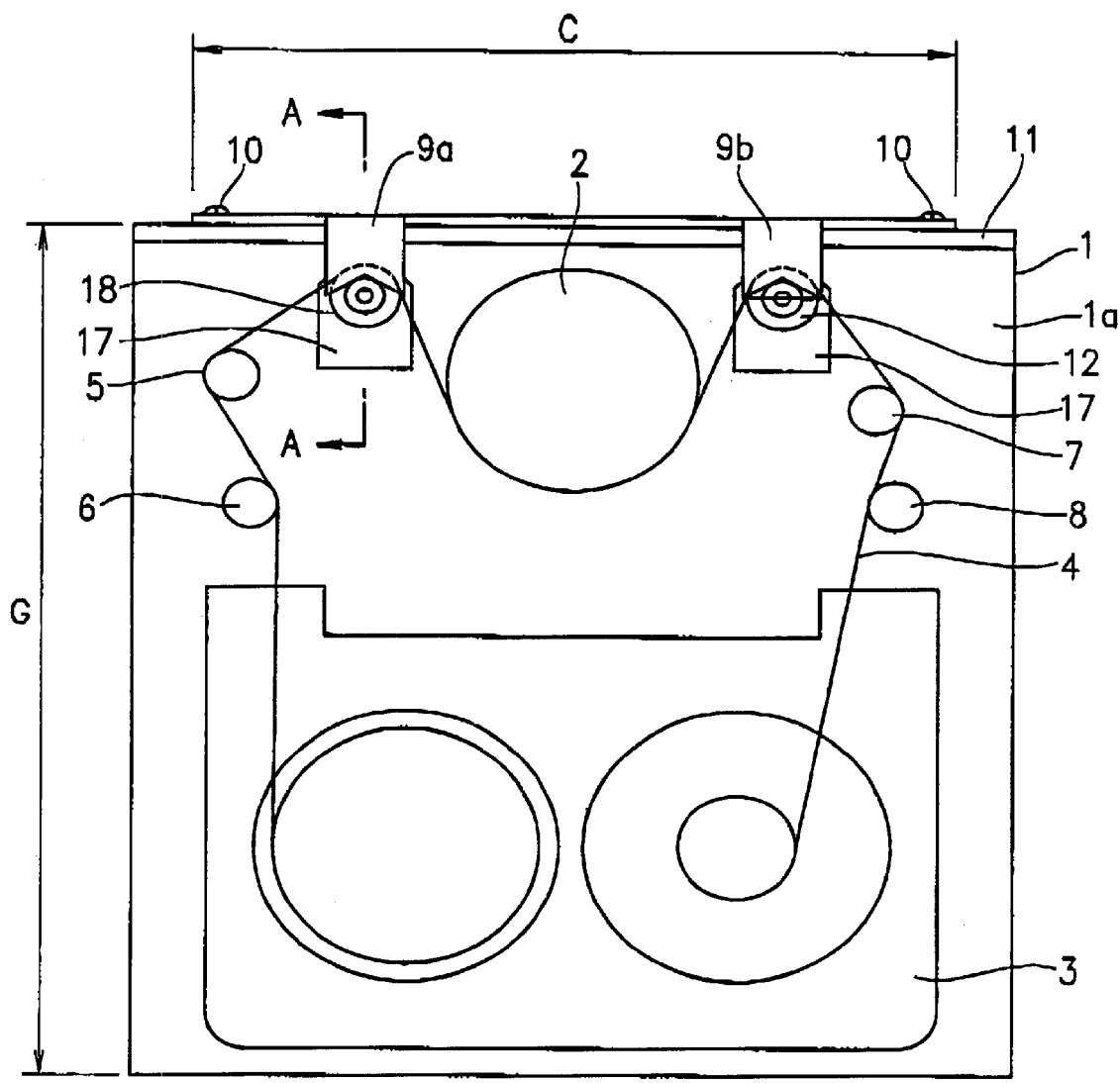
FIG. 1 is a top view of a magnetic recording/reproducing device according to Example 1 of the present invention.
Figure 2:
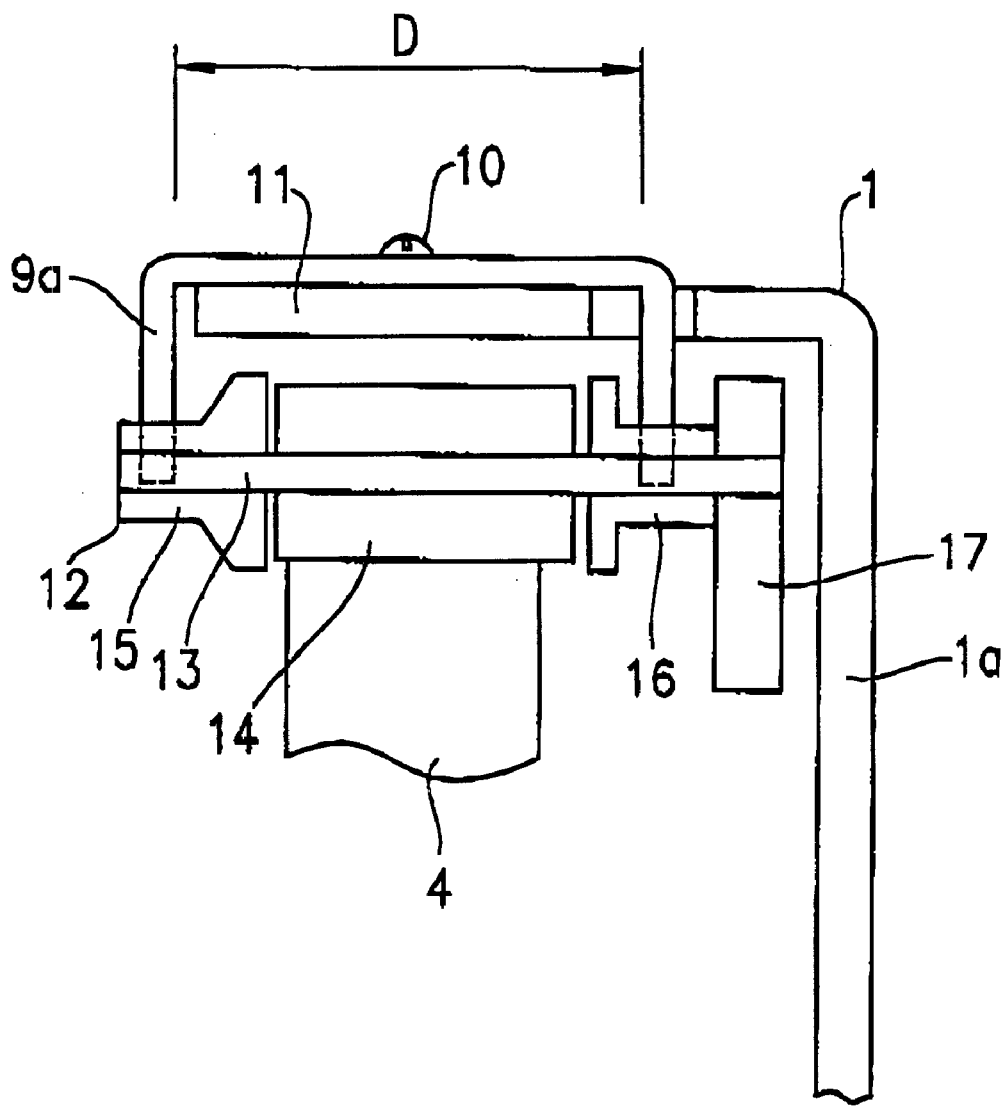
FIG. 2 is a cross-sectional view of the magnetic recording/reproducing device according to Example 1 of the present invention taken along line A—A shown in FIG. 1.
Figure 3:
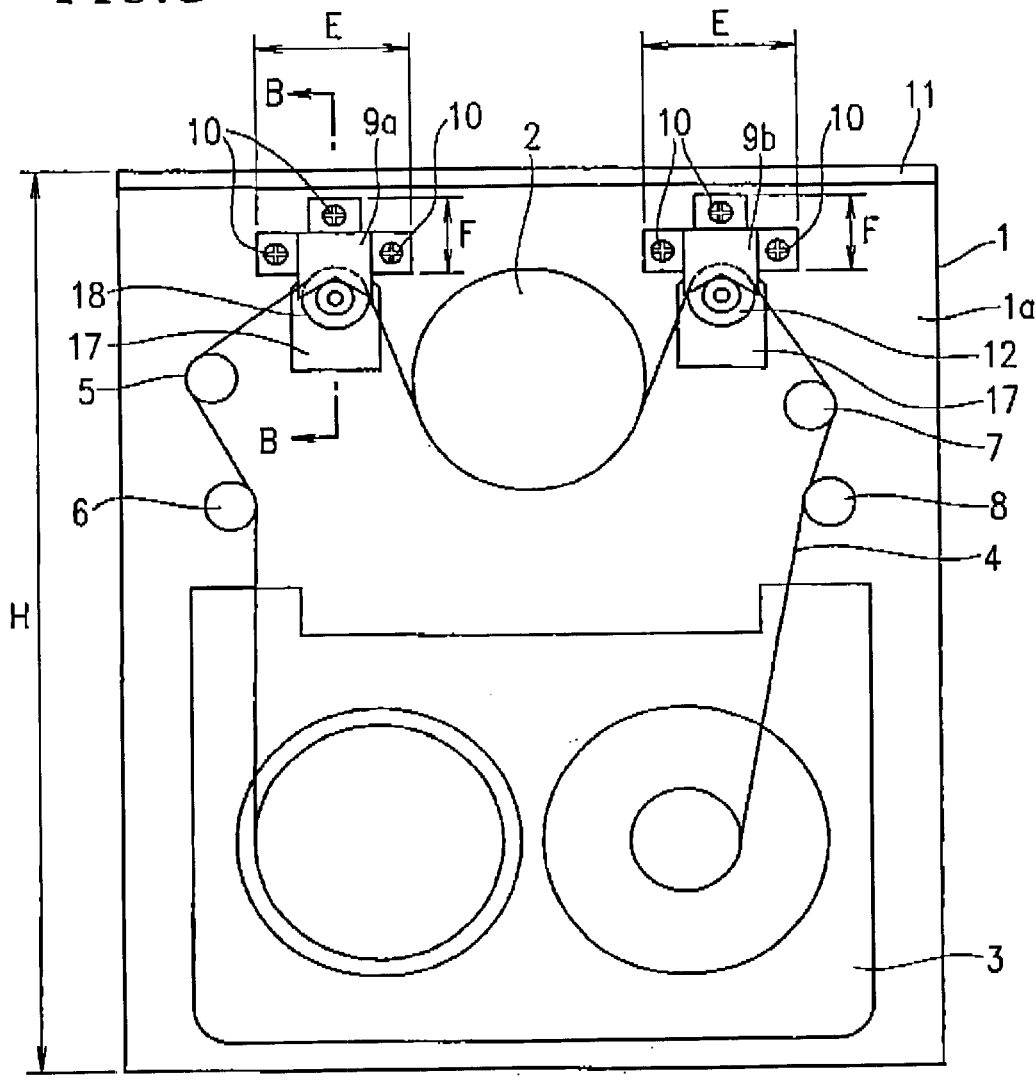
FIG. 3 is a top view of a conventional magnetic recording/reproducing device.
Figure 4:
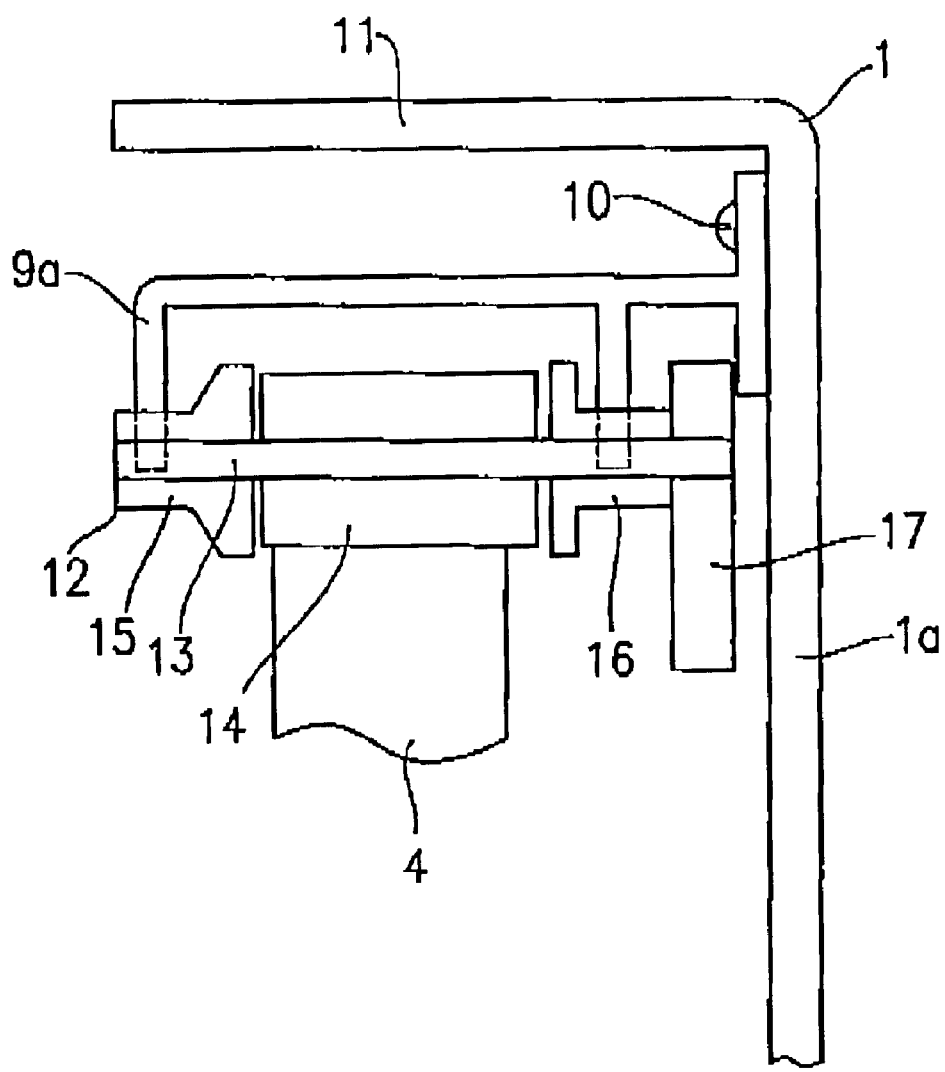
FIG. 4 is a cross-sectional view of the conventional magnetic recording/reproducing device taken along line B—B shown in FIG. 3.

FIG. 1 is a top view of a magnetic recording/reproducing device according to Example 1 of the present invention, and FIG. 2 is a cross-sectional view of the magnetic recording/reproducing device according to Example 1 of the present invention taken along line A—A shown in FIG. 1. In FIGS. 1 and 2, components having the same functions and the same names as those components shown in FIGS. 3 and 4 are denoted by the same reference numerals.

In FIGS. 1 and 2, reference numeral 1 denotes a substrate, reference numeral 1a denotes a horizontal plane of the substrate 1, reference numeral 2 denotes a rotary head cylinder mounted on the horizontal plane 1a of the substrate 1, reference numeral 3 denotes a cassette placed on the substrate 1, reference numeral 4 denotes a (magnetic) tape of the cassette 3, reference numerals 5, 6, 7 and 8 denote tape guide members for guiding the tape 4, reference numeral 9a denotes a first post stopper, and reference numeral 9b denotes a second post stopper. The post stoppers 9a and 9b have the same structure. Reference numeral 10 denotes a screw used for attaching the post stoppers 9a and 9b to the horizontal plane 1a of the substrate 1. Reference numeral 11 denotes a vertical reinforcing wall provided on the substrate 1. In the vicinity of the rotary head cylinder 2. The reinforcing wall 11 lies in a vertical plane with respect to the horizontal plane 1a of the substrate 1. The vertical reinforcing wall 11 is provided on the substrate 1, since the substrate 1 is required to be precisely maintained in a prescribed condition (e.g., a size and form of the substrate is maintained) and is required to be strong in a region around the rotary head cylinder 2. It is common practice in the field of magnetic recording/reproducing devices to provide a vertical reinforcing wall, such as the vertical reinforcing wall 11, on a substrate of a magnetic recording/reproducing device for this purpose. The post stoppers 9a and 9b are integrally structured and attached to the vertical reinforcing wall 11 by the screws 10. Reference numeral 12 denotes a first roller post (first tape guide post), and reference numeral 18 is a second roller post (second tape guide post). As will be described below, the first roller post 12 and the second roller post 18 have the same structure and each of the first roller post 12 and the second roller post 18 includes a roller shaft 13, a roller 14, which is supported by the roller shaft 13 so as to be rotatable about the roller shaft 13, an upper flange 15, and a lower flange 16. The upper flange 15 and the lower flange 16 are placed on the roller shaft 13 and respectively define top and bottom positions of the tape 4 which is caused to wrap around the roller 14. The roller shaft 13 Is positioned in a roller post guide member 17 through pressing or the like.

The operation of the magnetic recording/reproducing device according to Example 1 of the present invention will now be described with reference to FIGS. 1 and 2.

The first roller post 12 is moved using the roller post guide member 17 by a tape guide post drive section (not shown) until the upper flange 15 and the lower flange 16 of the first roller post 12 come into contact with the first post stopper 9a, so that the movement of the first roller post 12 is stopped by the first post stopper 9a and is thereby placed in the prescribed position shown in FIGS. 1 and 2. The second roller post 18 is placed in the prescribed position shown in FIG. 1 in a similar manner. In this case, the upper flange 15 and the lower flange 16 of the second roller post 18 are in contact with the second post stopper 9b. The tape guide members 5 and 7 are also moved to their respective prescribed positions shown in FIG. 1 by the tape guide post drive section (not shown). In this operation, the tape 4 is drawn out from the cassette 3 by the motion of the first roller post 12, the second roller post 18 and the tape guide members 5 and 7 in a direction away from the cassette 3, so that the tape 4 is put in the state shown in FIG. 1.

In FIG. 1, C and D denote attachment spans which define the mounting precision of the first post stopper 9a and the second post stopper 9b with respect to the substrate 1, and G denotes the depth of the magnetic recording/reproducing device according to Example 1.

As described above, according to Example 1 of the present invention, the first post stopper 9a and the second post stopper 9b, which are used for placing the first roller post 12 and the second roller post 18 in their prescribed positions shown in FIG. 1, are integrally structured with each other and attached to the vertical reinforcing wall 11 provided on the substrate 1. Therefore, a space is not required for attaching the first post stopper 9a and the second post stopper 9b to the horizontal plane 1a of the substrate 1 by screws 10 as in the conventional structure, so that sufficient space is provided in a region around the rotary head cylinder 2, the first post stopper 9a and the second post stopper 9b for any other required operational elements. Thus, it is possible to provide such required operational elements in this region around the rotary head cylinder 2, the first post stopper 9a and the second post stopper 9b, and thereby to realize a compact magnetic recording/reproducing device. Moreover, according to Example 1 of the present invention, since the first post stopper 9a and the second post stopper 9b are integrally structured with each other and are attached to the vertical reinforcing wall 11 provided on the substrate 1, it is possible to provide the attachment spans C and D which are larger than the conventional attachment spans E and F, so that it is possible to mount the first post stopper 9a and the second stopper 9b on the substrate 1 with high precision, since fine adjustment of the placement of the first and second stopper posts 9a and 9b is made possible. Moreover, it is possible to provide a sufficiently narrow distance between the rotary head cylinder 2 and the vertical reinforcing wall 11 provided on the substrate 1, such that the region around the rotary head cylinder 2 is sufficiently strengthened so as to provide reliable operation of the magnetic recording/reproducing device while providing a smaller depth G of the magnetic recording/reproducing device and therefore a more compact size of the device.

In the above description, the first post stopper 9a and the second post stopper 9b are integrally structured with each other so as to provide easy attachment to the vertical reinforcing wall 11 with the screws 10. However, the magnetic recording/reproducing device according to the present invention can be structured such that the first post stopper 9a and the second post stopper 9b are separately attached to the vertical reinforcing wall 11 by the screws 10.

Further, each of the first post stopper 9a and the second post stopper 9b can be provided on a back face of the vertical reinforcing wall 11 of the substrate 1. The substrate 1 can have holes through which corresponding parts of the first post stopper 9a and second post stopper 9b pass so as to be respectively engaged with the first roller post (first tape guide post) 12 and the second roller post (second tape guide post) 18 and place the first roller post 12 and the second roller post 18 at their respective prescribed positions.

Furthermore, In the above description, the first post stopper 9a and the second post stopper 9b are provided at each side of the rotary head cylinder 2. However, the magnetic recording/reproducing device according to the present invention can be structured such that a single post stopper is provided on a single side of the rotary head cylinder 2.

Further still, in the above description, the tape guide post drive section is not specifically described since a commonly known drive section can be used.

As described above, according to the present invention, it is possible to provide a compact, reliable and precisely structured magnetic recording/reproducing device in which a post stopper can be mounted on a substrate with high precision by employing large attachment spans without requiring an undesirably large space for attaching the post stopper to the substrate in a region around a rotary head cylinder.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording/reproducing device in which a tape drawn from a cassette wraps around a rotary head cylinder at a prescribed angle for recording information on or reproducing information from the tape, comprising:

a substrate on which the rotary head cylinder is provided;

a tape guide post for drawing the tape from the cassette and causing the tape to wrap around the rotary head cylinder, the tape guide post being movable between an initial position and a prescribed position; and a post stopper for placing the tape guide post at the prescribed position, wherein the substrate includes a reinforcing wall in the vicinity of the rotary head cylinder, the reinforcing wall being in a vertical plane with respect to a horizontal plane of the substrate, and the post stopper is adjustably fastened to the vertical reinforcing wall.

2. A magnetic recording/reproducing device according to claim 1, wherein the position of the post stopper on the vertical reinforcing wall can be finely adjusted such that the post stopper places the tape guide post at the prescribed position with high precision.

3. A magnetic recording/reproducing device according to claim 1, wherein the tape guide post includes a first tape guide post and a second tape guide post, and the post stopper includes a first post stopper and a second post stopper for respectively placing the first and second tape guide posts in respective first and second prescribed positions, the first and second post stoppers being respectively provided upstream and downstream of the tape traversal direction around the rotary head cylinder.

4. A magnetic recording/reproducing device according to claim 3, wherein the first and second post stoppers are integrally structured with each other.

5. A magnetic recording/reproducing device according to claim 4, wherein the integrally structured first and second post stoppers are fixed to the vertical reinforcing wall by screws.

6. A magnetic recording/reproducing device according to claim 5, wherein the fixing positions of the first and second post stoppers on the vertical reinforcing wall can be finely adjusted such that the first and second post stoppers respectively place the first and second tape guide posts at the respective first and second prescribed positions with high precision.

7. A magnetic recording/reproducing device according to claim 1, wherein the post stopper is provided on a back face of the reinforcing wall of the substrate and the substrate has a hole through which a part of the post stopper passes so as to be engaged with the tape guide post and place the tape guide post at the prescribed position.

* * * * *